Dec. 22, 1942. V. J. GRAF 2,305,866
METHOD FOR MAKING LAUNDRY TUBS OR THE LIKE
Filed Sept. 5, 1939 6 Sheets-Sheet 1

INVENTOR
Vincent J. Graf.
BY Dike, Calver & Gray
ATTORNEYS.

Dec. 22, 1942.   V. J. GRAF   2,305,866
METHOD FOR MAKING LAUNDRY TUBS OR THE LIKE
Filed Sept. 5, 1939   6 Sheets-Sheet 2

INVENTOR
Vincent J. Graf.
BY Dike, Calver & Gray
ATTORNEYS.

Dec. 22, 1942.　　　　V. J. GRAF　　　　2,305,866
METHOD FOR MAKING LAUNDRY TUBS OR THE LIKE
Filed Sept. 5, 1939.　　　6 Sheets-Sheet 3

INVENTOR
Vincent J. Graf.
BY Dike, Calver & Gray
ATTORNEYS.

Dec. 22, 1942.                V. J. GRAF                2,305,866
         METHOD FOR MAKING LAUNDRY TUBS OR THE LIKE
              Filed Sept. 5, 1939         6 Sheets-Sheet 4

INVENTOR
Vincent J. Graf.
BY Dike, Calver & Gray
ATTORNEYS.

Dec. 22, 1942.　　　　V. J. GRAF　　　　2,305,866
METHOD FOR MAKING LAUNDRY TUBS OR THE LIKE
Filed Sept. 5, 1939　　　6 Sheets-Sheet 5

INVENTOR
Vincent J. Graf
BY Dike, Calver & Gray
ATTORNEYS.

Dec. 22, 1942.  V. J. GRAF  2,305,866
METHOD FOR MAKING LAUNDRY TUBS OR THE LIKE
Filed Sept. 5, 1939  6 Sheets-Sheet 6

INVENTOR
Vincent J. Graf.
BY Dike, Calver & Gray
ATTORNEYS

Patented Dec. 22, 1942

2,305,866

UNITED STATES PATENT OFFICE 2,305,866

METHOD FOR MAKING LAUNDRY TUBS OR THE LIKE

Vincent J. Graf, Detroit, Mich., assignor to Briggs Manufacturing Company, Detroit, Mich., a corporation of Michigan Application September 5, 1939, Serial No. 293,386

21 Claims. (Cl. 113—120)

This invention relates to an improved method for fabricating by stamping operations from sheet material, such as sheet steel, articles having a plurality of adjacent sumps or basins, such for instance as combination laundry tub or sink units. This application is a continuation in part of my application Serial No. 251,059, filed January 16, 1939.

One of the difficulties confronted in the art of making such articles, particularly from a single sheet of material, has been the breaking and tearing of the metal between the sumps or basins. Forming even a single basin of considerable depth presents many technical difficulties and requires considerable skill and experience. Forming two sumps or basins is more complicated, and if the basins are located closely adjacent each other, their formation becomes more and more diffcult as the depth of the basins increases and the distance between them decreases. The difficulties are primarily due to the fact that in the formation of a basin in a flat blank as the metal is pressed down, the surrounding portions of the blank contribute some of their metal to the basin, and flow of metal takes place in the blank. To facilitate such flow, basins are formed in flat sheets and their formation is one of the first operations in fabricating an article. Any obstructions such as flanges, beads and the like which may be formed in the path of the flowing metal prevent free flow of the metal and cause the metal to overstretch and break between such obstructions and the basin.

In forming a double basin sink, the first basin is formed in a flat blank without serious difficulties, since the blank is flat around all four sides of the basin and there is no obstruction to the flow of metal thereto. However, when formation of two adjacent basins is attempted, either simultaneously with the first basin or successively, there is not enough metal between the basins to flow into the second basin or into both of them, and the metal tends to break in the space between the basins.

One of the objects of the present invention is to provide an improved method of fabricating stamped articles having closely adjacent basins of considerable depth.

Another object of the invention is to provide an improved method for fabricating a double basin sink, the article being formed from a single metal sheet and adapted to be utilized for laundry purposes as a laundry tub or in part for the purposes of ordinary sink.

A further object of the invention is to provide an improved method for producing a combination laundry tub or tray unit or a sink unit pressed or otherwise formed from sheet metal, preferably from a single sheet, and embodying a double sump or the like construction and an upright splash panel or splashback, the unit being formed with marginal flanging around the sumps, and around the edges of the splash panel if embodied in the unit, so as to provide a completed article of durable and strong construction as well as of attractive appearance which may be given an enamel finish substantially free of blemishes and imperfections.

A further object of the invention is to provide an improved method, for carrying out the method, for fabricating a one-piece pressed metal combination laundry tub or tray unit of double sump or the like construction in which the junctures of the rim and splashback and the two sumps are smooth and seamless in character, thereby providing an article which may be more readily and attractively finish coated.

Other objects of this invention will appear in the following description and appended claims, reference being had to the accompanying drawings forming a part of this specification wherein like reference characters designate corresponding parts in the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
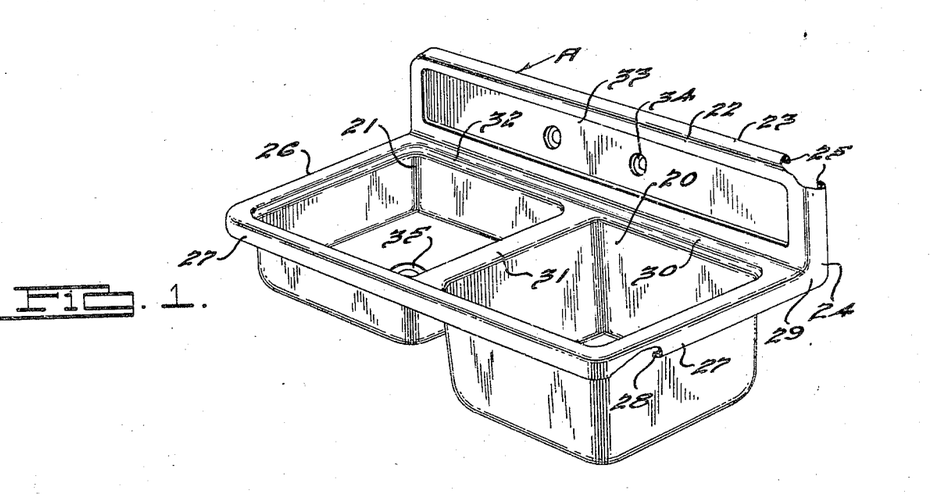
Fig. 1 is a perspective view of a combination laundry tub unit having two adjacent basins and an upright splash panel, the illustrated structure being formed from a single metal sheet in accordance with the method embodying the present invention.

In Fig. 1 there is illustrated, by way of example, at A a combination sink and laundry tray unit having a double sump construction and produced in accordance with the method and apparatus embodying the present invention. In the present instance, as shown in Fig. 1, the combination laundry tub or laundry tray unit comprises a relatively deep drawn basin or sump 20 and a somewhat shallower basin or sump 21. Extended upwards from the rear side of the basins is an upright splash panel or splashback 22 which is formed with continuous rearwardly extended flanging comprising a top horizontal flange 23 and vertical end flanges 24. The top and end flanging 23 and 24 of the splash panel are formed with inturned wall flanges 25 extending around three sides of the splash panel 22. The sumps or basins 20 and 21 terminate at their upper end and front edges in an outwardly extending generally horizontal rim 26 and this rim terminates in a depending apron 27. The lower edge of the apron flanging 27 is formed with inturned flanging 28 which extends along the front and ends of the sumps 20 and 21. The rim 26 as also the depending apron 27 extends continuously around the three sides of the sumps, and the rear ends of the apron 27 merge preferably seamlessly into the vertical splash panel flanging 24 at the locality of area 29. The rim 26 also merges seamlessly into a generally horizontal back ledge 30 which extends the full length of the article between the back walls of the sumps 20 and 21 and the upright splash panel, this ledge 30 merging seamlessly into the splash panel and preferably extending substantially in the same plane as the rim 26.

The adjacent upright walls of the sumps or basins 20 and 21 are spaced apart and seamlessly joined at their upper edges by a double wall partition forming a bridge or saddle portion 31 which separates the sumps or basins at an intermediate point. Intermediate the upper edges of the front, back and end walls of the sumps and the rim 26 and ledge 30, there is formed a step or offset 32 extending continuously around four sides of the basins. This offset in effect forms a single primary basin which merges into the sumps 20 and 21 which in effect form sub-basins within the confines of the primary basin. The front and rear ends of the partition wall 31 merge smoothly into the step or offset 32 and the upper edge of the wall 31 lies in substantially the plane of the bottom of the step 32 and, therefore, slightly below the plane of the marginal rim 26. The upright splashback 23 is also preferably formed with an outwardly embossed panel 33 lying entirely within the area of the splashback. This panel may be embossed and pierced to provide apertures 34 to receive faucets. The bottoms of the sumps or basins 20 and 21 are also embossed and pierced to provide drain openings 35.

The combination sink and laundry tray unit A is formed from a single metal sheet in a series of dies, certain selected portions thereof being herein illustrated. It will be understood that the relative depths of the basins or sumps 20 and 21 as well as the depths of either or both thereof may be varied as desired and that the basin 21, for example, may have the same depth as the basin 20 to provide a double sump unit for laundry purposes only. In the illustrated embodiment of Fig. 1 the sump 21 is somewhat shallower so as to serve both the purposes of an auxiliary laundry tub and a sink.

Figure 2:
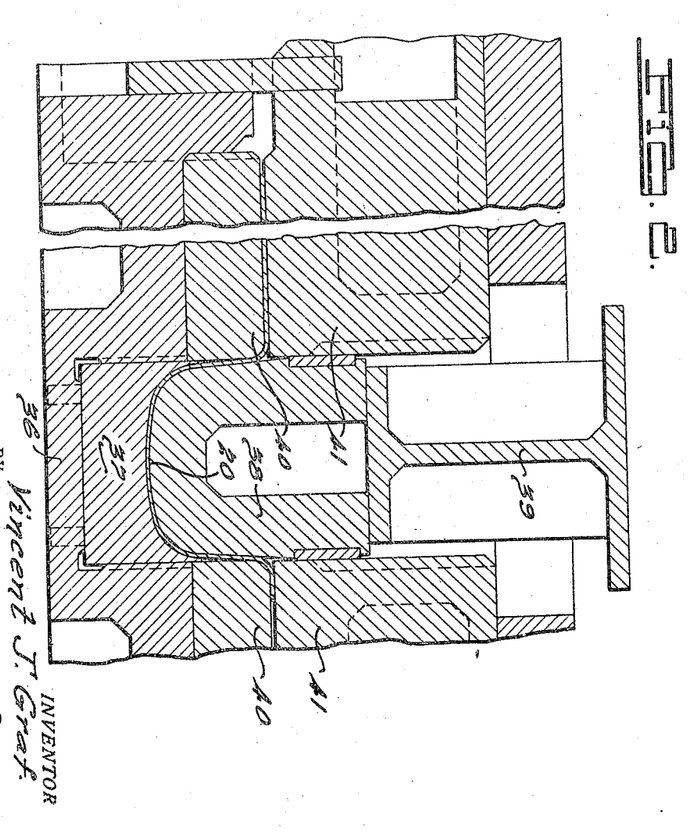
Fig. 2 is a fragmentary sectional view of a portion of a die apparatus for preliminarily drawing one of the sumps or basins.

In Fig. 2 there is shown a portion of a suitable die apparatus for preliminarily drawing the deep sump 20. This apparatus in general comprises a bed 36, a lower die member 37 and an upper draw die member or punch 38 cooperating with the die member 37 to draw the sump or basin 20 in a flat sheet metal blank B cut or blanked out to the proper size and shape. The blank holding means may comprise a lower die ring or blank holding die pad 40 and an upper hold down ring or blank holding member 41 cooperating with the ring 40. The punch 38 is attached to a ram 39 for vertical reciprocation therewith. In Fig. 2 the die is shown in closed position and is preferably used in a toggle or double acting draw press, the condition of the blank after the draw operation being clearly illustrated in Fig. 2 and also in Figs. 3 and 4.

Figures 3, 4, 5:
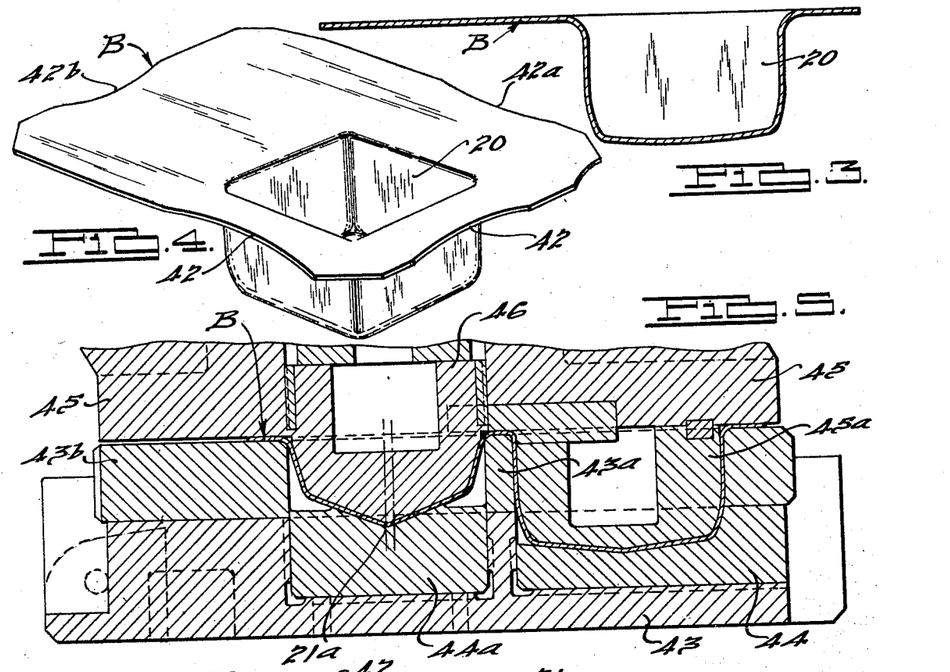
Fig. 3 is a transverse sectional view illustrating the blank as it issues from the die apparatus of Fig. 2.
Fig. 4 is a perspective view of the blank of Fig. 3.
Fig. 5 is a sectional view of a die apparatus for preliminarily drawing or preforming the second basin in the metal blank shown in Fig. 4.

After the blank B has been operated upon in the die device illustrated in Fig. 2 it assumes the shape as shown in Figs. 3 and 4. An examination of Fig. 4 shows that in forming the deep basin 20 the metal is drawn from all four sides of the basin 20 thus adding more metal to the walls of the basin. It is clear that if wide margins are provided around the basin sufficient metal is available for drawing the basin 20. If the margin is narrow the amount of metal which may be drawn therefrom is limited and the margin caves in, such as shown at 42. This caving in is much smaller in cases of wider margins as is clearly seen in Fig. 4 at 42a and 42b. The flow of metal is facilitated when the blank is flat, since flanges, beads and the like interrupt free flow of metal and cause tearing or breaking of the blank between such obstructions and the basin.

It will now be clear in view of the foregoing that if a second or shallow basin 21 be formed closely adjacent the first or deep basin 20, as is necessary for manufacturing the sink illustrated in Fig. 1, the right-hand wall of the basin 21, which is to say the wall adjacent the basin 20, has insufficient marginal metal to draw from, since the only margin available for forming this wall is the top portion of the bridge 31. Since no metal can be drawn back from the basin 20, metal being unable to flow around the corner, and since no caving in, such as shown at 42, 42a and 42b in Fig. 4, can occur in this case, drawing of the basin 21 will ordinarily cause tearing or breaking of the metal in the bridge portion 31, usually along the edge of the left-hand wall of the basin 20.

In accordance with the present invention the steps of the formation of the adjacent basins 20 and 21 are so arranged that both basins can be formed to a desired depth and close to each other without tearing the metal of the blank. In accordance with the invention, the second basin 21 is first preliminarily drawn to its approximate shape in a die device, such as illustrated in Fig. 5. Said die device may comprise a die bed 43 in which there are arranged die pads 44 and 44a. A portion 43a is arranged between the pads 44 and 44a for the formation of the bridge portion 31. A stationary blank holding pad 43b cooperates with the movable blank holding portion 45 secured to the ram of the press (not shown) in a manner well known in the art. Said portion 45 is provided with an extension 45a entering into the basin 20. The press in which this die device is used is of the double acting type, and in operation, after the blank B is inserted into the die device, the portion 45 with the extension 45a comes down first in order to hold the blank in position. Thereupon, the punch 46 comes down pressing the metal of the blank down to form the basin 21 to its preliminary shape. Said preliminary shape of the basin 21 is such as to facilitate flowing of the metal. It is preferable to draw the basin 21 in the first operation in such a way as to provide inwardly converging walls and a bottom sloping down to its center at a relatively large angle, see Figs. 5 and 6a.

Figure 6:
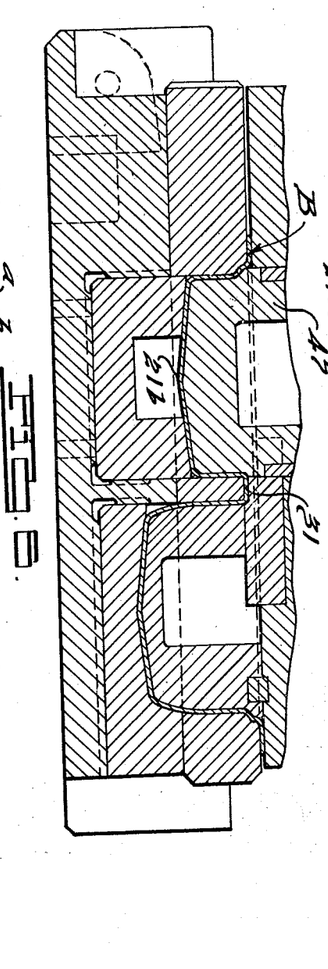
Fig. 6 is a sectional view of a die apparatus for final drawing or restriking the second basin in the metal blank.
Figure 6A:
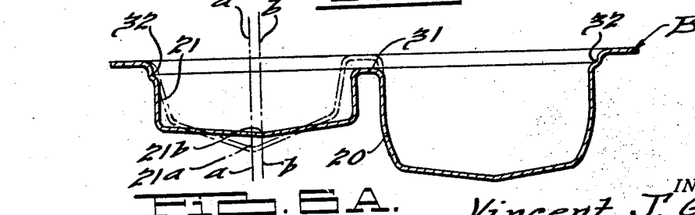
Fig. 6a is a sectional view of the blank operated upon in the die apparatus shown in Fig. 6, the dotted lines showing the sectional outline of the second sink as preliminarily drawn in the die apparatus shown in Fig. 5.

After the blank is removed from the die device illustrated in Fig. 5, it is operated upon in the die device illustrated in Fig. 6. The construction of the die apparatus of Fig. 6 is substantially similar to that of the die apparatus illustrated in Fig. 5, the difference being in the shape of the punch 47, which punch is adapted to restrike or to draw the basin 21 to its final shape. Fig. 6a shows in solid lines the blank B in cross section when the same is removed from the die apparatus of Fig. 6. In the dotted lines in said Fig. 6a there is shown a cross section of the blank after it has been operated upon in the die apparatus of Fig. 5. An examination of said figure shows that the lowermost portion 21a of the basin 21 as preliminarily drawn extends much deeper than the lowermost portion 21b of the bottom of the finished basin. The projected area of the bottom of the basin 21 as preliminarily drawn is considerably smaller than that of the finally drawn basin 21 but the actual area of the basin as preliminarily drawn is substantially equal to that of the finally drawn basin 21. Therefore, when the basin 21 is restruck in the die device of Fig. 6, the operation of finally forming the bottom of the basin 21 is that of unbending the bottom and flattening the same rather than stretching the metal thereof. By virtue of such a step tearing of the metal in the bottom of the basin 21 is prevented.

Tearing of the metal in the bridge portion 31 is prevented by restriking the basin 21 in such a way that its wall adjacent to the basin 20 is moved for a predetermined distance toward said basin 20. In other words, the restriking of the sump 21 is made on a center line b—b which is closer to the basin 20 than the center line a—a on which the basin 21 is preliminarily drawn. An examination of Figs. 5 and 6 shows that the die portion 43a of the die device of Fig. 5 is considerably wider than the corresponding portion of die device of Fig. 6. By virtue of such a method a certain quantity of metal which was included in the bridge portion 31 as preliminarily drawn becomes available for pushing down into the basin 21 in the final formation thereof. It should also be appreciated that the offset 32 is also formed in the die device of Fig. 6, and the top surface of the bridge portion 31 is made considerably lower than in the blank in which the basin 21 is preliminarily drawn. An examination of Fig. 6a shows that the portion 31 as preliminarily drawn extends upward to be flush with the outside or marginal rim portions of the blank. Thus in effect a considerable part of the metal included in the bridge portion 31 as preliminarily drawn is bent down and is used in the formation of the basin 21 in the restriking thereof. This prevents tearing of the metal of said bridge portion 31.

Figures 7, 8:
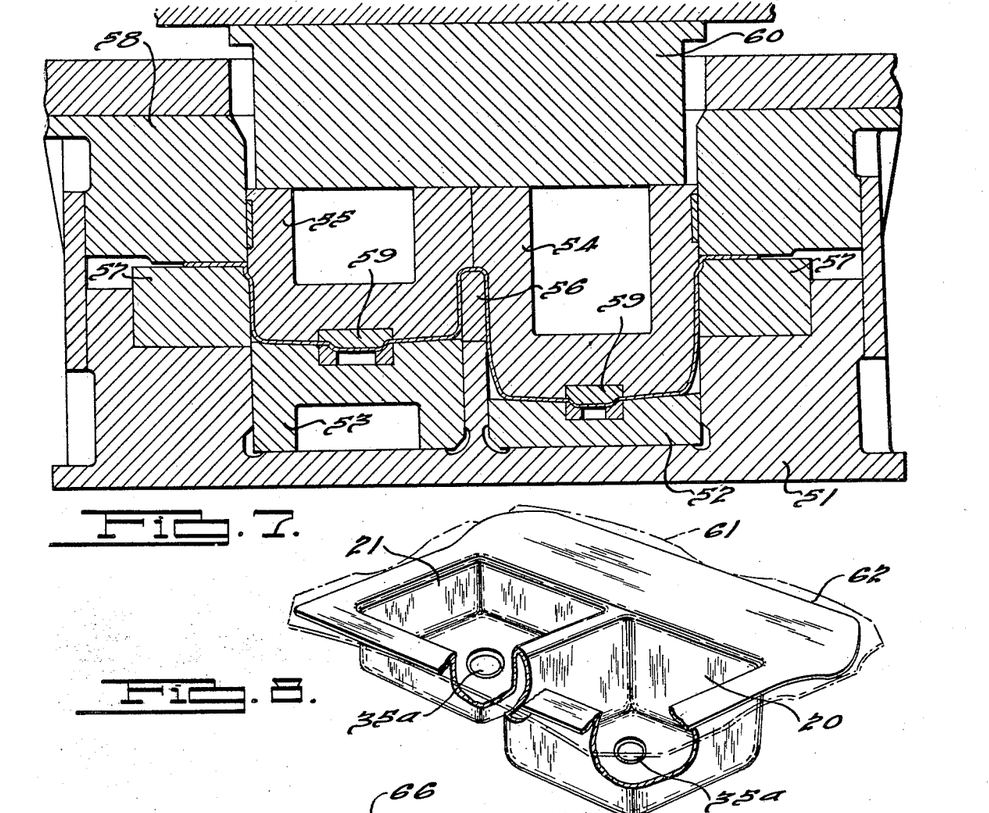
Fig. 7 is a sectional view of the die apparatus for embossing the bottoms of the basins for providing drain holes.
Fig. 8 shows in perspective a blank with bottoms of the basins being embossed.

The partially finished blank of Fig. 6a is thereupon introduced into a die apparatus such as shown in Fig. 7. This die apparatus may comprise a bottom 51 carrying spaced lower die pads or die members 52 and 53 with which upper die members or punches 54 and 55, respectively, cooperate. Interposed between the upper die members and the lower die members is a die insert 56. The blank holding means may comprise a lower ring 57 cooperating with an upper blank holding die pad or hold down ring 58, the marginal edges of the blank being gripped between said rings 57 and 58. The lower die members 52 and 53 have incorporated therein means generally indicated at 59 for embossing the metal downwardly in the centers of the basins 20 and 21 as shown at 35a in Fig. 8. The upper die members 54 and 55 are connected to the vertical reciprocating ram 60 of a suitable press and in conjunction with the lower die members 52, 53 and 56 function to restrike the basins and complete the final shaping and drawing thereof. In addition, they finally shape the upper or bridge portion 31 in the manner illustrated in Fig. 7.

After the operation performed in the apparatus of Fig. 7 the blank will have a construction substantially like that illustrated in Figs. 7 and 8. The horizontal marginal rim of the blank as it issues from the apparatus of Fig. 7 may appear approximately like that shown in dotted lines at 61 in Fig. 8. The article is then preferably placed in a suitable apparatus (not shown) and the edges of the blank trimmed to approximately the shape shown in full lines at 62 in Fig. 8.

Figure 9:
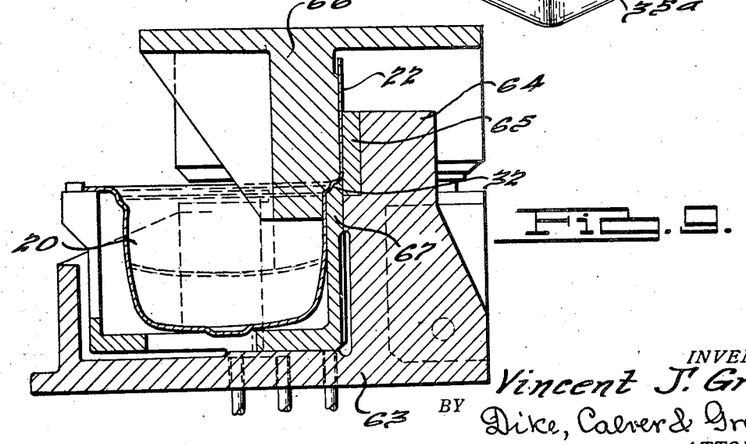
Fig. 9 is a fragmentary sectional view of a die apparatus for forming or bending up the splash panel or splashback.

The blank, after having the edges trimmed, as shown by comparing the dotted lines 61 and full lines of Fig. 8, is preferably introduced into a die apparatus such as shown in Fig. 9 which functions to form up the splash panel 22. This die apparatus may comprise a bed 63 having an upright portion 64 provided with a hardened die insert 65. The apparatus also comprises upper and lower die members 66 and 67 which cooperate to hold the blank in position and to reform the marginal stepped or offset portion 32 extending around the upper edges of the sumps. In addition, the upper die member 66 cooperates with the die insert 65 to form up the splash panel 22. The die of Fig. 9 is shown in closed position and the blank is also illustrated in Figs. 9 and 10 in its condition after the described operations are performed thereon in the apparatus of Fig. 9.

Figure 10:
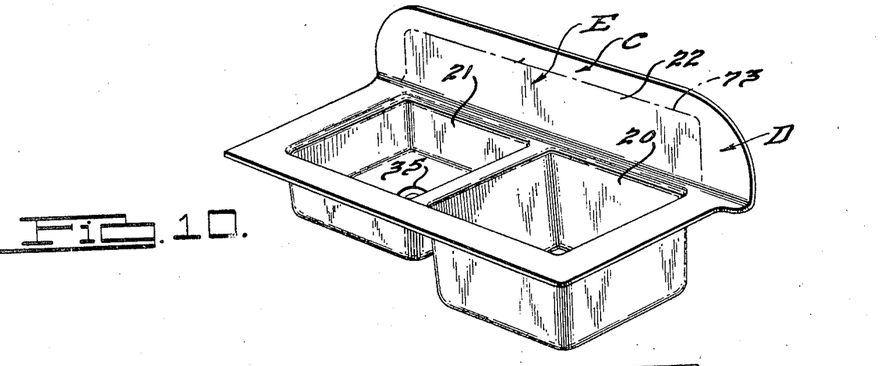
Fig. 10 is a perspective view of the article substantially as it issues from the die apparatus of Fig. 9.
Figure 11:
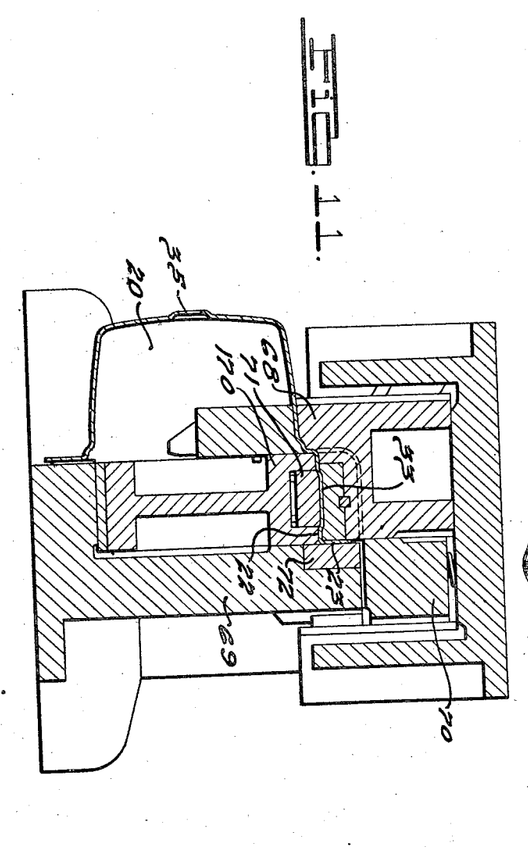
Fig. 11 is a fragmentary sectional view of a die apparatus for drawing or forming the top and end flanging on the splash panel and for embossing the same centrally.
Figure 12:
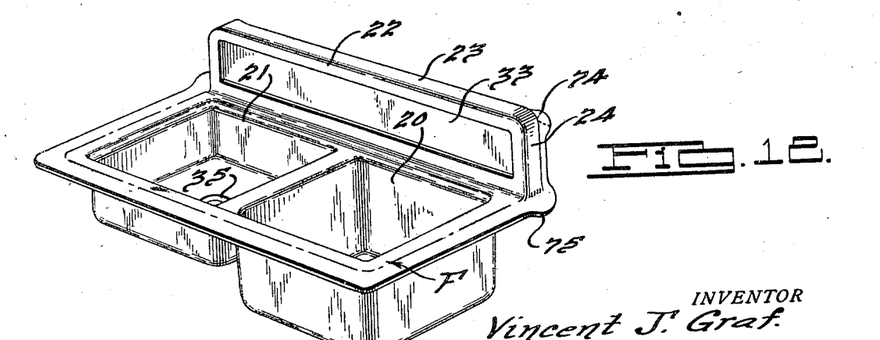
Fig. 12 is a perspective view of the article substantially as it issues from the die apparatus of Fig. 11.

In Fig. 11 there is shown a mechanism for embossing at 33 the face of the splashboard or splash panel 22 and for forming the flanges 23 and 24 on the top and ends of the splashboard. This mechanism also comprises a punch or male form 68 which is actuated from the ram of the press and cooperates with a hardened steel insert 72 of the die 69 to form the top and end flanges of the splashboard. A hold down ring or binder plate 70 binds the metal in the space between it and the die 69 to hold it from buckling or wrinkling when formed. A die pad or binder plate 170 is actuated by suitable pressure pins (not shown) and serves to hold the metal between itself and the punch 68. The die pad 170 carries a steel embossing member or insert 71 which is also actuated by pressure pins (not shown) also carried by the die pad 170. Upward movement of the member 71 against the sheet metal of the splash panel embosses the face thereof as shown at 33. Thus, the mechanism of Fig. 11 produces the top flange 23 and the end flanges 24 as well as the embosed panel 33, as shown in Fig. 12. It will be noted that in the operation performed by the mechanism of Fig. 11 the back panel is formed with a continuous flange 23—24 In accomplishing this the marginal metal of the splashback is pressed or drawn rearwardly substantially along the dotted line 73 of Fig. 10. The integrally joined metal areas C and D are simultaneously drawn or pressed rearwardly in the same direction while at the same time the metal areas indicated at E and F are held in fixed position between the cooperating die members. Thus, the blank after the operation in the apparatus of Fig. 11 may emerge therefrom in substantially the condition shown in Fig. 12, the splash panel having the continuous flanging 23—24 which preferably merges seamlessly into the horizontal flanging F extending around three sides of the sumps, and the splashback also having the embossed panel 33 within the area thereof.

It may also be noted that the success of the steps bringing the blank shown in Fig. 10 to the shape illustrated in Fig. 12 does not depend upon the fillet or the radius of curvature in the corners between the splash panel and the ledge 30, or between the flange 24 and the portion 75 (see Fig. 12). In addition to the sequence of the above described steps, the success depends partly upon allowing sufficient margins in the portion 75 and adjacently the flange 24, from which to draw additional metal for preventing tearing of the metal at the juncture of flange 24 and the portion 75.

Figure 13:
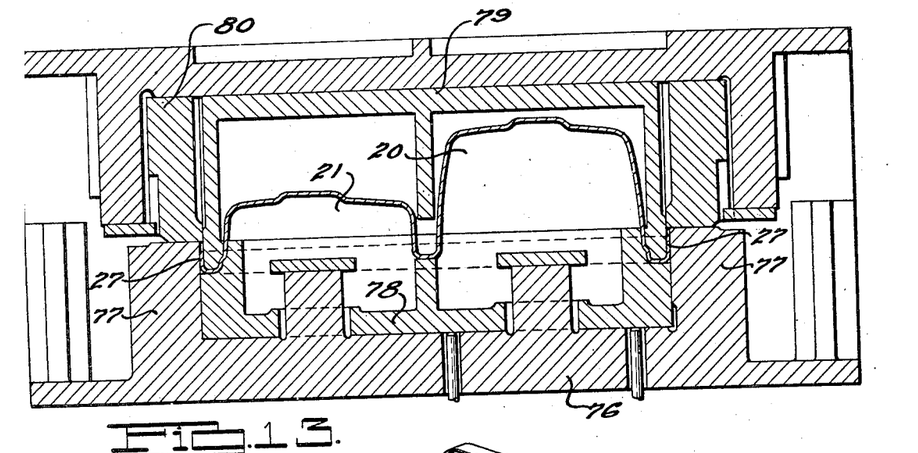
Fig. 13 is a fragmentary sectional view of a die apparatus for flanging down the marginal rim extending around three sides of the sumps or basins.

The article substantially as illustrated in Fig. 12 may be introduced into a die apparatus, such as illustrated in Fig. 13, which operates to form the downturned apron flanging 27 extending around the front and ends of the basins. It will be understood that prior to this operation the excess metal at points 74 and 75 (Fig. 12) may be trimmed off if desired.

Figure 14:
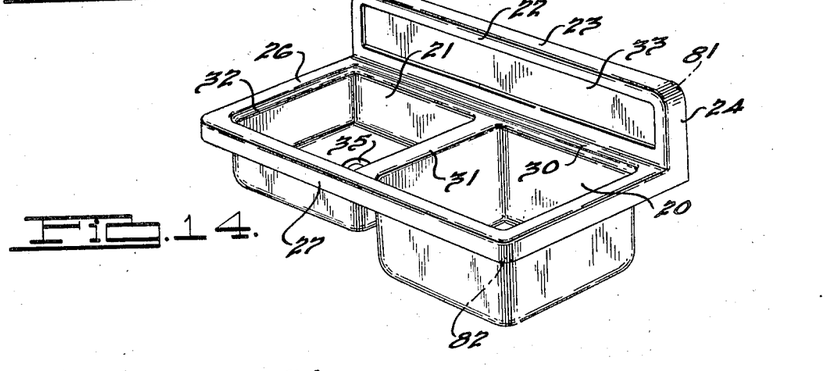
Fig. 14 is a perspective view of the article substantially as it issues from the die apparatus of Fig. 13.
Figure 15:
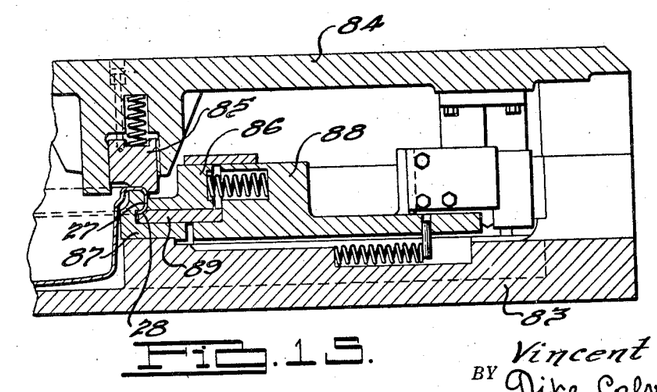
Fig. 15 is a fragmentary sectional view of a portion of a die apparatus for forming the inturned flanging along the front and sides of the depending apron which extends around three sides of the basins or sumps.

As illustrated in Fig. 13 the die apparatus for drawing down the apron flange 27 may comprise a bed 76 having an upstanding lower die ring or member 77, an inner binder plate or die member 78, a punch 79 and an upper hold down ring or binder 80. The blank or article of Fig. 12 is placed within the apparatus of Fig. 13 which forms in one operation the downturned apron flange 27 extending around three sides of the sumps, the parts of the apparatus being shown in position at the completion of this operation and the article after issuing from this apparatus having substantially the construction and appearance as shown in Fig 14. Thereafter the lower edges of the apron flange 27 may be finish trimmed in any suitable trimming mechanism preparatory to the formation of the inturned flanges 28 along the lower edges of the apron 27 and the wall flanges 25 along the top and end edges of the splash panel 22. Prior to the formation of these flanges the opposite upper corners of the splash panel may be notched at 81 and the opposite front lower corners of the apron 27 notched at 82. The blank substantially in the condition illustrated in Fig. 14 may be introduced into a flanging apparatus, such as illustrated in Fig. 15, to form the inturned flanging 28 around the lower edge of the apron 27. This apparatus may be in the form of a single acting sheet bending or flanging press having a cam operated die. As illustrated in Fig. 15 the apparatus may include a bed 83 and a ram 84. Blank holders or binder members for the marginal rim of the blank are indicated at 85, 86 and 87. The ram 84 operates, through a wedge and cam mechanism, a slide 88 which in turn actuates a flanging die member 89 which cooperates with the die member 87 to bend inwardly the lower edge of the apron 27 as shown at 28.

Figure 16:
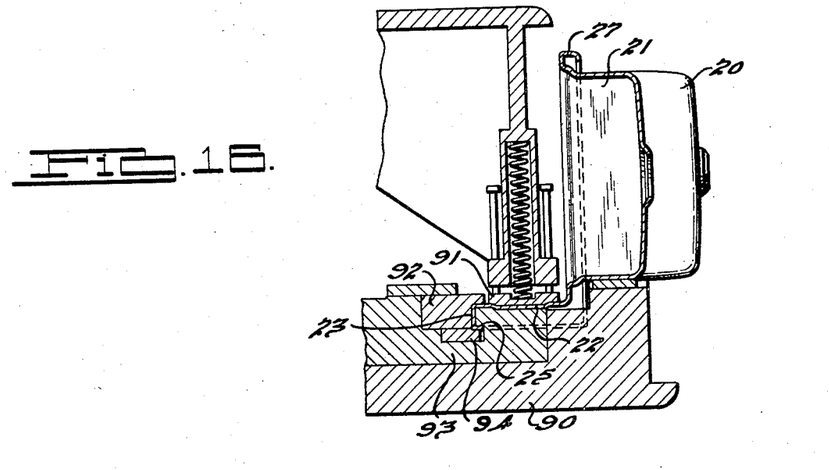
Fig. 16 is a fragmentary sectional view of a portion of a die apparatus for forming the inturned wall flanges along the top and ends of the splash panel or splashback.

The wall flanges 25 extending along the top and vertical ends of the splash panel 22 may also be formed in an apparatus, such as shown in Fig. 16, which functions in a manner generally similar to that of the flanging apparatus of Fig. 15. As illustrated in Fig. 16, the apparatus may include a bed 90, suitable binder or blank holding die members 91 and 92, a cam operated slide 93 and a bending or flanging die member 94 adapted to bend the marginal edges of the flanging 23, 24 of the splash panel to form the wall flanges 25. The finished article after issuing from the apparatus of Fig. 16 will have substantially the construction and appearance of the article shown in Fig. 1. Drain holes 35 may be pierced in embossments 35a with the aid of a suitable device any time after the embossments 35a are formed.

Figure 17:
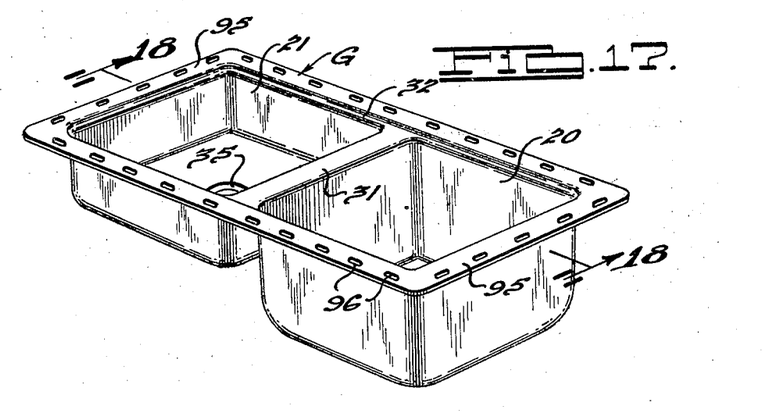
Fig. 17 is a perspective view of a double basin combination laundry unit formed with a flat marginal rim extending around four sides of the basins.
Figure 18:
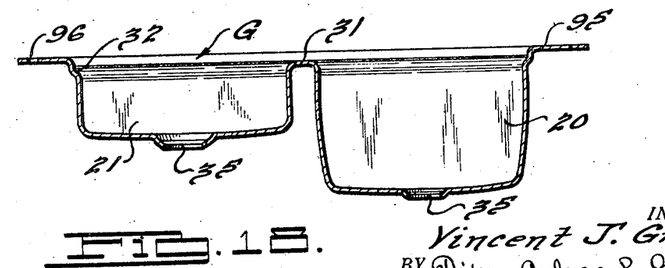
Fig. 18 is a vertical section taken substantially through lines 18—18 of Fig. 17 looking in the direction of the arrows.

In Figs. 16 and 17 there is illustrated a combination laundry or sink unit G of double sump construction having a relatively flat horizontal rim 95 extending around all four sides of the sumps. This structure is produced in accordance with the steps of the method described above in connection with Figs. 1 to 8 inclusive. After the blank issues from the apparatus of Fig. 7, the flat rim, indicated by dotted lines at 61, extending around the two basins or sumps may be trimmed in a suitable trimming or blanking mechanism so as to provide the rim 95 of Fig. 16 which is preferably of uniform width around all four sides of the basins. In the same operation in which the rim 95 is trimmed or blanked out from the unfinished blank of Fig. 8 it may also be punched or pierced to provide a series of spaced slots 96 for the reception of fastening devices by means of which the article of Figs. 16 and 17 may be mounted in a table assembly.

Although in the manufacture of the laundry or sink unit, such as shown in Fig. 1, the foregoing method is preferred in production, it will be understood that the invention is not limited to the sequence of steps herein described but that some of the steps of the method may be carried out in different sequence or order if desired. For example, the apron flanging 27 extending around the front and ends of the sumps or fluid receiving bowls 20 and 21 may be first formed and thereafter the splashback 22 bent or formed up or the flanging 23 and 24 of the splashback may be produced after the apron flange 27 is drawn down. Other changes in the order or sequence of the steps of the method may also be made without departing from the spirit and scope of the invention. In the present instance the ledge 30 extending continuously along the rear of the bowls or sumps 20 and 21 has approximately the same width or slightly greater width than the width of the turned rim 26. However, the ledge 30, if desired, may be substantially wider and in like manner the rim 26 may be made wider, if desired, and the apron flange 27 may be formed to a greater depth. It will also be noted that in carrying out the method in the preferred form thereof the partition rim or saddle 31 is initially formed, as shown in Fig. 5, so that it has substantially the same height as the height of the outturned rim portions surrounding the bowls. Thereafter as shown, for example, in Fig. 7 the partition rim 31 is given its final shape while at the same time the surrounding marginal horizontal rim is raised above the height of the rim 31 and formed with the reinforcing or stiffening offset or step formation 32. Thus, in constructing the article in this manner the bottom of the step or offset 32 lies substantially at the same height as the partition rim 31 which merges thereinto and the marginal rim 26 in the finished article extends to a greater height than the partition member 31.

I claim:

1. In a method of manufacturing from sheet material an article having a plurality of adjacently located basins, the steps of forming one basin in a blank, preliminarily forming the next adjacent basin on a center line further from said first basin than in the finished article, and thereupon finally drawing said second basin on its intended center line.

2. In a method of manufacturing from sheet material an article having two adjacent basins, the step of drawing one basin in a blank, said step being followed by a step of preliminarily drawing the second basin in said blank at a distance from the first basin further than in the finished article, and thereupon restriking the second basin to its final form at the intended distance from said first basin.

3. In a method of manufacturing from sheet metal an article having two adjacent basins of different depths, the steps of drawing the deep basin in a blank, said step being followed by the step of preliminarily drawing the shallow basin on a center line further from the deeper basin than the final center line of the shallow basin in the finished article, and thereupon restriking the shallow basin on said final center line.

4. In a method of manufacturing from sheet metal an article having two adjacent basins of different depths, the steps of drawing the deep basin in a blank, said step being followed by the step of preliminarily drawing the shallow basin to an approximate shape with inwardly tapering walls and on a center line further from the deeper basin than the final center line of the shallow basin in the finished article, and thereupon restriking the shallow basin on the final center line.

5. In a method of manufacturing from sheet metal a tub or sink having a relatively deep basin and a relatively shallow basin adjacent to said deep basin, the steps of drawing the deep basin, drawing the shallow basin to its approximate shape with inwardly converging walls and to a greater depth than in the finished sink, and thereupon restriking the shallow basin to its final shape, said restriking being done in such a way as to move the wall of said shallow basin adjacent the deeper basin closer to said deep basin.

6. In a method of manufacturing from sheet metal a tub or sink having two adjacently situated basins and a bridge portion separating the same, the steps of drawing one of the basins in a metal blank, drawing the second basin to its preliminary shape with inwardly converging walls and bottom sloping to its middle, and thereupon restriking said second basin to provide substantially parallel walls and a less sloping bottom, the restriking step being done in such a way that said bridge portion is made narrower and part of its metal is pressed down to form the top of the adjacent wall of said second basin.

7. In a method of fabricating from sheet metal a tub or sink having two adjacently situated basins and a bridge portion separating the same, the steps of drawing one of the basins in a metal blank, drawing the second basin to a preliminary shape, restriking the second basin to its final shape, drawing a part of the metal of said bridge portion into said second basin, and forming a continuous generally horizontal turned rim around three sides of the basins.

8. In a method of fabricating from sheet metal a tub or sink having two adjacently situated basins and a bridge portion separating the same, the steps of drawing one of the basins in a metal blank, drawing the second basin to a preliminary shape, pressing down a part of the metal of said bridge portion into said second basin, and forming a continuous generally horizontal turned rim around three sides of the basins extending to a greater height than said bridge portion.

9. In a method of fabricating from sheet metal a tub or sink having two adjacently situated basins and a bridge portion separating the same, the steps of drawing one of the basins in a metal blank, drawing the second basin to a preliminary shape, restriking the second basin to its final shape, pressing down a part of the metal of said bridge portion into said second basin, forming a continuous generally horizontal turned rim around three sides of the basins, and forming an offset or step along the basins adjacent the inner margin of said turned rim.

10. In a method of fabricating from sheet metal a tub or sink having two adjacently situated basins and a bridge portion separating the same, the steps of drawing one of the basins in a metal blank, drawing the second basin to a preliminary shape, restriking the second basin to its final shape, pressing down a part of the metal of said bridge portion into said second basin, forming a generally horizontal turned rim around three sides of the basins, drawing up a splashback at the outer margin of the turned rim along one side of the basins, and drawing down a depending apron along the outer margin of the turned rim at the other three sides of the basins.

11. In a method of fabricating from sheet metal a tub or sink having two adjacently situated basins and a bridge portion separating the same, the steps of drawing one of the basins in a metal blank, drawing the second basin to a preliminary shape, restriking the second basin to its final shape, pressing down a part of the metal of said bridge portion into said second basin, forming a continuous generally horizontal turned rim around four sides of the basins, drawing up a splashback at the outer margin of the turned rim along one side of the basins, drawing down a depending apron along the outer margin of the turned rim at the other three sides of the basins, and forming rearwardly turned top and end flanging on the splashback which is seamless with the ends of the depending apron.

12. In a method of fabricating from sheet metal a tub or sink having two adjacently situated basins and a bridge portion separating the same, the steps of drawing one of the basins in a metal blank, drawing the second basin to a preliminary shape, restriking the second basin to its final shape, pressing down a part of the metal of said bridge portion into said second basin, forming a continuous generally horizontal turned rim around three sides of the basins and a rearwardly extending ledge along the fourth side, drawing up a splashback at the outer margin of the ledge, drawing down a depending apron along the outer margin of the turned rim at the other three sides of the basins.

13. In a method of fabricating from sheet metal a tub or sink having two adjacently situated basins and a bridge portion separating the same, the steps of drawing one of the basins in a metal blank, drawing the second basin to a preliminary shape, restriking the second basin to its final shape, drawing a part of the metal of said bridge portion into said second basin, forming a continuous generally horizontal turned rim around three sides of the basins, and bending up the metal at one side of the basins along a seamless line spaced from the basins to provide a rearwardly extending ledge and an upright splashback.

14. A method of making from sheet metal an article having two adjacent basins, comprising drawing a basin in a blank adjacent the other basin with an intervening double wall partition forming adjacent walls of the basins, one basin being preliminarily formed with its partition wall extended away from the adjacent partition wall further than in the finished article, and restriking said one basin to position its said partition wall closer to the adjacent partition wall.

15. A method of making from sheet metal an article having two adjacent basins, comprising drawing a basin in a blank adjacent the other basin with an intervening double wall partition forming adjacent walls of the basins, one basin being preliminarily formed with its partition wall extended away from the adjacent partition wall further than in the finished article, and restriking said one basin to position its said partition wall closer to the adjacent partition wall and to lower the height of the partition.

16. A method of making a double basin tub, sink or the like, comprising drawing one basin in a sheet metal blank adjacent the other basin with a bridge portion therebetween, and drawing a part of the metal of the bridge portion into the said one basin to narrow said bridge portion and change the shape of said one basin.

17. A method of making from sheet metal a double basin tub or sink or the like, comprising preliminarily drawing one basin adjacent the other basin to an approximate shape, said basin being separated by a double wall partition, and restriking the said one basin to bring the walls of said partition closer together.

18. A method of making from sheet metal an article having two adjacent basins, comprising drawing said basins with an intervening double wall partition, the upper edges of the partition walls being joined by a bridge portion, forming a turned rim around three sides of the basins, forming a rearwardly extending ledge along the fourth side of the basins, and depressing the bridge portion to position the same below the plane of said rim while moving a part of the metal of the bridge portion into one of the basins.

19. A method of making from sheet metal an article having two adjacent basins, comprising drawing said basins with an intervening double wall partition, the upper edges of the partition walls being joined by a bridge portion, forming a turned rim around three sides of the basin, forming a rearwardly extending ledge along the fourth side of the basins, and moving a part of the metal of the bridge portion into one of the basins to narrow the bridge portion.

20. A method of making from sheet metal an article having two adjacent basins, comprising drawing said basins with an intervening double wall partition, the upper edges of the partition walls being joined by a bridge portion, forming a turned rim around three sides of the basin lying substantially at the height of said bridge portion, and moving a part of the metal of the bridge portion into one of the basins to change the shape of said basin.

21. A method of making from sheet metal an article having two adjacent basins, comprising drawing said basins with an intervening double wall partition, the upper edges of the partition walls being joined by a bridge portion, forming a turned rim around three sides of the basins, and moving a part of the metal at the upper edge of the partition into one of the basins to narrow said bridge portion.

VINCENT J. GRAF.